United States Patent
Erdmann

[11] Patent Number: 5,838,489
[45] Date of Patent: Nov. 17, 1998

[54] REFRACTIVE BROAD BAND IR OBJECTIVE

[75] Inventor: Matthias Erdmann, Munich, Germany

[73] Assignee: Britishi Aerospace, Hants, United Kingdom

[21] Appl. No.: 443,700

[22] Filed: May 18, 1995

[30] Foreign Application Priority Data

May 21, 1994 [DE] Germany ............ 44 17 888.3

[51] Int. Cl.⁶ ............... G02B 1/00; G02B 13/14
[52] U.S. Cl. ............................. 359/357; 359/356
[58] Field of Search .................... 359/356, 357

[56] References Cited

U.S. PATENT DOCUMENTS

| | | | |
|---|---|---|---|
| 4,738,496 | 4/1988 | Canzek | 359/357 |
| 5,363,235 | 11/1994 | Kiunke et al. | 359/365 |

FOREIGN PATENT DOCUMENTS

| | | |
|---|---|---|
| 0467240 | 1/1992 | European Pat. Off. |
| 2206704 | 1/1989 | United Kingdom |

OTHER PUBLICATIONS

Thomas Jamieson, Ultrawide Waveband Optics, 1984, vol. 23, No. 2, pp. 111–116.

M.W. McDowell, H. W. Kee, A Chromatization in the 3 to 5μM Spectral Region with Visible Light Transmitting Materials, 1984, vol. 23, No. 2, pp. 187–192.

Primary Examiner—Jon W. Henry
Attorney, Agent, or Firm—Kanesaka & Takeuchi

[57] ABSTRACT

In a multi-lens infrared objective with wide band chromatic correction, more particularly in the spectral range from 1.4 to 5 μm silicon is employed as a material for lenses with a negative focal length. In this respect the lenses consist of materials, which as regards their dispersion curves are selected from three different material group, of which the first material group comprises materials, whose short wave absorption bands are relatively close to the shortest wavelength to be corrected, the second group comprises materials, whose long wave absorption bands are closer to the spectral range to be corrected than the short wave ones and the third group comprises materials, whose relative absorption band positions are between the materials of the first and second groups.

11 Claims, 3 Drawing Sheets

REFRACTIVE BROAD BAND IR OBJECTIVE

BACKGROUND OF THE INVENTION

The invention relates to a multi-lens infrared objective.

Cameras which operate in the conventional infrared spectral range (3 µm–5 µm and 8 µm–12 µm), are practically insensitive for daylight and are completely insensitive for the near infrared range (1.4 µm to 3 µm). However it is just in this spectral range that important information of a scene is comprised to the extent that such spectra are included. As a general rule in such spectral ranges it is a question of secondary light in a scene (daylight, spotlights). Thus window glass is transparent up to approximately 2.5 µm and structures in a landscape are more readily recognized in their spatial relationship and form, when they are illuminated by the sun and they are emphasized by light and shadow and printed and embossed lettering is readable in a manner dependent on the dye employed.

Modern PtSi detectors are sensitive down to approximately 1.4 µm. In the case of IR cameras, which operate in the 3–5 µm range (MIR range), this is considered to be inconvenient since the image in the 1.4 µm to 3 µm spectral range (SWIR range) veils the IR image. A 1.4–3 µm refractive IR optical system in the conventional spectral range of 3–5 µm is not chromatically corrected in accordance with the prior art as far as 1.5 µm. If however the optical system is still optically transparent in this spectral range, the short wave spectral range will be incident on the detector, it then producing a blurred image. For this reason as a rule a filter is interposed, which shuts off the short wave fraction.

SHORT SUMMARY OF THE INVENTION

One object of the invention is to provide a refractive optical system with an enhanced performance, which is chromatically corrected in the spectral range of essentially 1.4–5 µm and accordingly is able to present a sharp image from both spectral ranges (SWIR and MIR). It is to be possible to dispense with a filter.

In addition to the enhanced sensitivity in the MIR range as well there is to be the possibility for instance of being able to see through window panes in the SWIR range, for example by daylight, of being able to read lettering or characters and to render thermal camouflage ineffective, since it is not possible to utilize such camouflage simultaneously for both spectral ranges.

In order to produce images in such two different spectral ranges it has so far been necessary to employ, besides purely reflecting telescopes, two separate optical systems (separate channels) with different chromatic correction, or it was necessary to utilize a dual band optical system, the light path being split by means of a dichroitic ray splitter in different manners. In either case the correction states of the optical systems are different in the different spectral ranges. The production of reflecting telescopes is suitable in those cases in which a steady viewing field is involved and the higher price for the aspherical mirror surfaces is insignificant.

A refractive IR optical system in the 3–5 µm range is in accordance with the prior art composed of positive lenses and of silicon (Si) and negative ones of $CaF_2$, ZnS, ZnSe or germanium. This design is obvious, since in this wavelength range silicon is the material with the minimum dispersion. Simultaneously silicon possesses a very high refractive index and a good, substantially temperature independent transmission coefficient, unlike germanium, whose transmission coefficient decreases to a considerable extent at higher temperatures. Furthermore silicon is non-toxic and comparatively cheap. Accordingly in this wavelength range it is to be regarded as the ideal "crown glass" for lenses with a positive refractive power. However this conventional design does not lead to a way of attaining the above mentioned object of the invention of creating an objective with sufficiently good chromatic correction between approximately 1.4 µm and 5 µm.

The group of objectives in accordance with the invention is chromatically corrected over the entire wavelength range from approximately 1.4 µm to 5.0 µm.

Such a wide band chromatic correction was initially thought to be impossible using a refractive system, more especially since the selection of lens materials in this spectral range is very limited and the spectral bands are immediately adjacent to one another.

In an advantageous manner the invention provides a combination of at least three lens materials in order to achieve sufficient chromatic correction. The materials able to be employed for correction are to be arranged in three groups as regards their dispersion curves:

The first group includes materials whose short wave absorption bands are relatively close to the shortest wavelength (here 1.4 µm) to be corrected. The dispersion of such materials sharply increases toward the short wavelengths.

The second group comprises materials, whose long wave absorption bands are closer to the spectral range to be corrected than its short wave ones. The dispersion of such material decreases toward the short wavelengths and increases toward the long wavelengths.

The third group includes materials, whose relative absorption band positions are between the materials of the first and second groups. The dispersion of these materials as a rule increases slightly toward the short wavelengths. The absorption bands are relatively far removed from the spectral range of interest.

Typical, advantageous representatives in these groups are for example: Silicon and various chalcogenide glasses (for example $As_2S_3$ commercially available in the form "Ig1.1" of the Vitron Company) in the group 1. In the case of chalcogenide glasses it is a question of vitreous, fused material combinations of elements of the main groups IV–VI of the periodic system with good optical properties in the wavelength range between 0.8 µm and 14 µm.

$CaF_2$, MgO and $BaF_2$ in the group 2.

ZnS, ZnSe and NaCl in the group 3.

The classification of the IR materials in accordance with this rule ts not in all cases unambiguous. Thus for instance commercially available thallium bromide-iodide with the designation "KR55" may be placed both in the group 1 and also in the group 3.

For chromatic correction it is possible in accordance with the invention to employ the materials as follows:

As a "crown glass" (glass with a low dispersion), that is to say preferably for lenses with a positive focal length, materials of the group 3 are utilized.

As a "flint glass" (with a high dispersion), i.e. preferably for lenses with a negative refractive focal length a combination of two materials of the groups 1 and 2 are employed. Combinations with silicon, that is to say for example Si, $CaF_2$ or Si, MgO function particularly satisfactorily.

In accordance with the invention in the case of this type of chromatic correction a material such as silicon is employed for negative lenses, and not for positive lenses, as is otherwise the case in this group of objectives. An ZnS—Si—CaF$_2$ optical system operates, to give an example, as follows: The abrupt increase in dispersion in the short wave range renders it impossible in the invention to employ silicon as a "crown glass" for chromatic correction. Silicon does however produce extremely low dispersion in the long wave range. It is consequently not possible to utilize silicon alone as a "flint glass". Combined with, for instance, calcium fluoride, the high dispersion of silicon in the long wave range makes it useful in order to achieve chromatic correction. Since dispersion of CaF$_2$ is abruptly reduced in the short wave range, the chromatic correction effect of silicon is in this case hardly affected. An optical system in accordance with the invention consequently operates in the short wave range, for example with a Zn—Si chromatic correction and in the long wave range, for example with a ZnS—CaF$_2$ chromatic correction.

DESCRIPTION OF THE PREFERRED EMBODIMENTS

Examples for the infrared objectives and the most significant parameters thereof in accordance with the invention are now presented:

EXAMPLE 1

Figure 1:
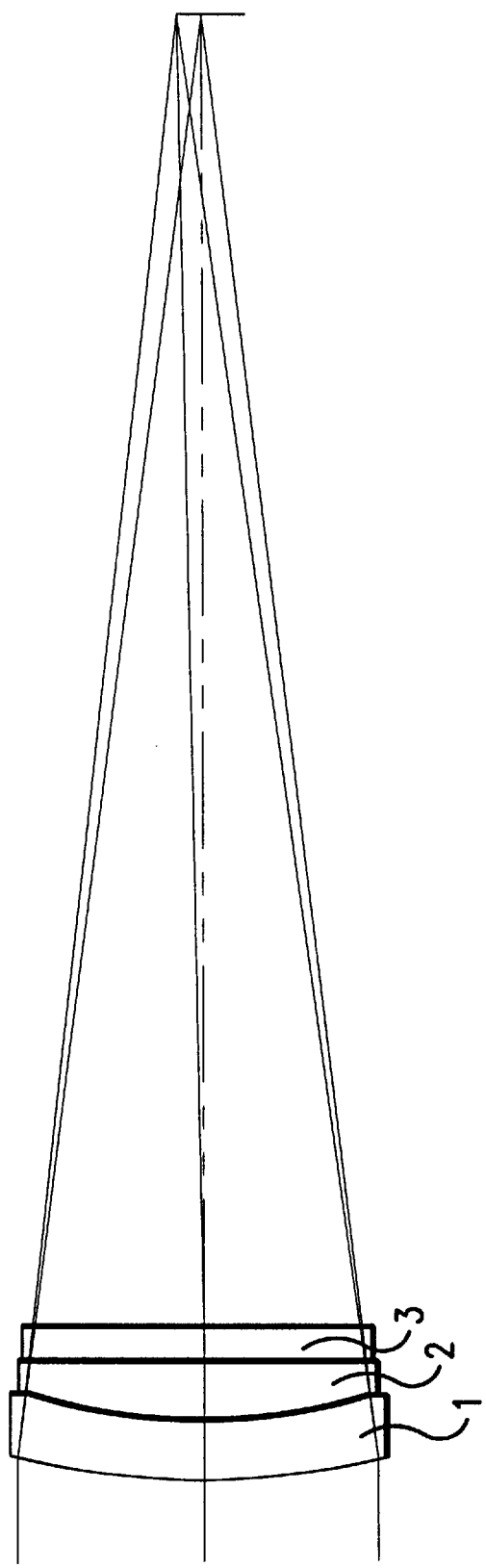
FIG. 1 is a side view of a three apochromat lens according to an embodiment of the invention.

This example relates to the simplest case of wide band chromatic correction with a simple three "apochromat" lens for a wavelength band of approximately 1.5–5 μm. As seen in the direction of the incident light the material of the first group is selected from the group 1, the material of the second lens is selected from the group 3 and the material of the third lens is selected from the group 2. Such a wide band apochromat is represented in FIG. 1. The sequentially placed lenses 1, 2 and 3 consist, taken in order, of Si, ZnS and MgO. In the image center the Si-ZnS-MgO apochromat achieves a Strehl value 4 of 0.96 and is accordingly refraction-limited over the entire wavelength band The relative aperture (F#) is 4.

EXAMPLE 2

Figure 2:
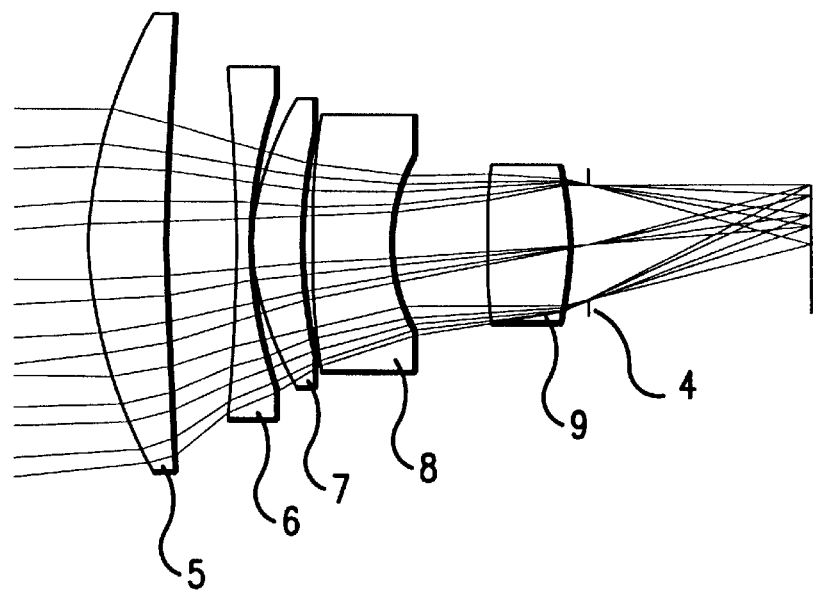
FIG. 2 is a side view of a five lens system according to another embodiment of the invention.

This example is five lens system with a focal length of 90 mm and a relative aperture of 2.0. The objective represented in FIG. 2 possesses a rear diaphragm 4 and may therefore be simply recalculated for a dewar. As seen in the direction of the incident light the lens materials, as taken in order, are selected from the groups 3, 2, 3, 1 and 3. In the example considered the lenses 5 through 9, as taken in order, consist of the ZnS, CaF$_2$, ZnS, Si and ZnS,.

EXAMPLE 3

Figure 3:
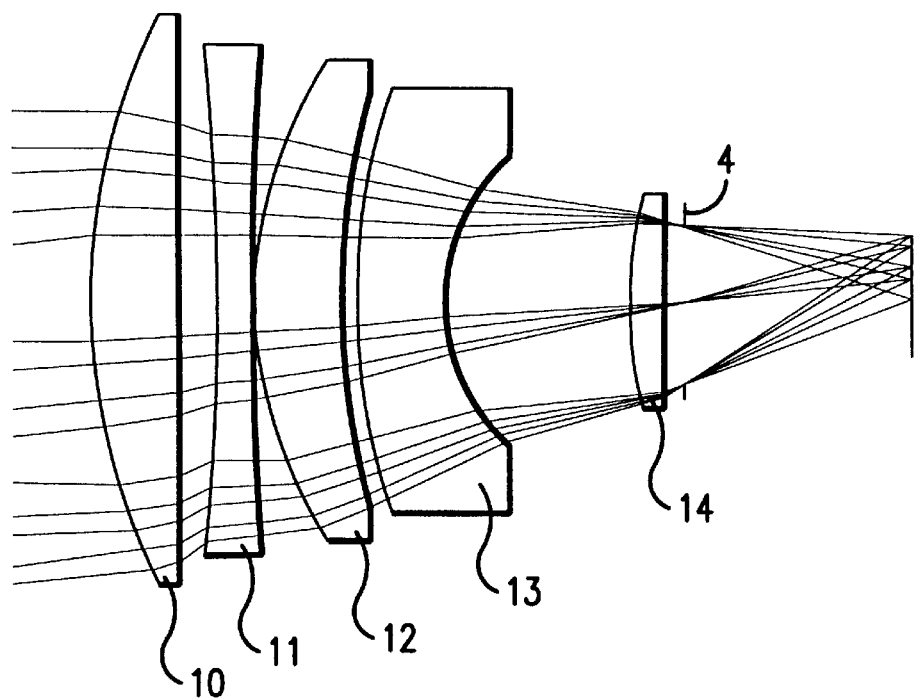
FIG. 3 is a side view of a five lens system according to still another embodiment of the invention.

FIG. 3 shows a five lens system with a focal length of 90 mm and a relative aperture of 1.4. The materials of the lenses 10 through 15 are selected in order from the groups 3, 1, 3, 2 and 3. In this respect the negative lenses of example 2 are changed around. That is to say, the materials of the positive lenses 10, 12 and 14 are selected, like the materials of the lenses of FIG. 2, respectively from the group 3 and consist in the case of the example respectively of ZnS, whereas the material for the negative lens 11 is selected from the group 1 and the material for the negative lens 13 is selected from the group 2. Preferably the second lens 11 consists of silicon and the fourth lens 13 consists of calcium fluor. The materials of FIG. 2 for the second and the fourth lenses 11 and 13 are swapped around. A respective rear diaphragm, as in example 2, is referenced 4.

EXAMPLE 4

Figure 4:
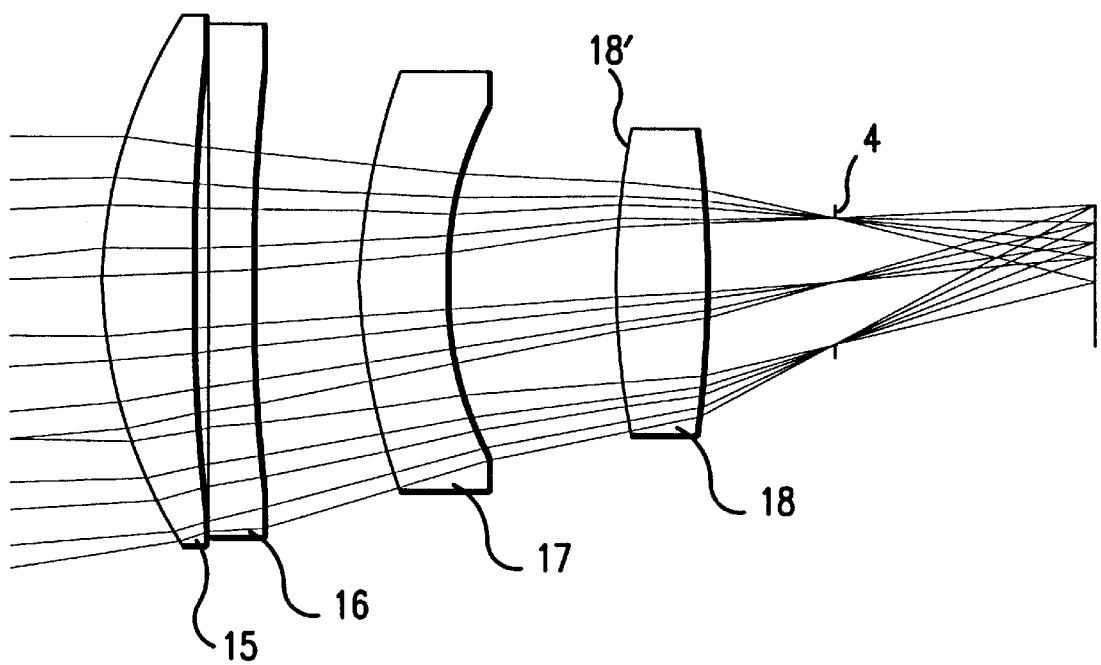
FIG. 4 is a side view of a four lens optical system according to yet another embodiment of the invention.

FIG. 4 shows a four lens optical system derived from example 5 with a focal length of 90 mm and a relative aperture of 2.0. Owing to the employment of an aspherical surface it is possible to have one lens less. This system has a slightly less satisfactory correction at the edge of the image, but would be adequate for many applications. The materials of the lenses 15 through 18, are as seen in the direction of the incident light, in order, selected from the groups 3, 1, 2 and 3. In the case of the example the first lens 15 consists of ZnS, the second one 16 of Si, the third one 17 of CaF$_2$ and the fourth lens 18 of ZnS. The aspherical surface on the fourth lens 18 is denoted 18'. A rear diaphragm like in examples 2 and 3 is referenced 4.

EXAMPLE 5

Figure 5:
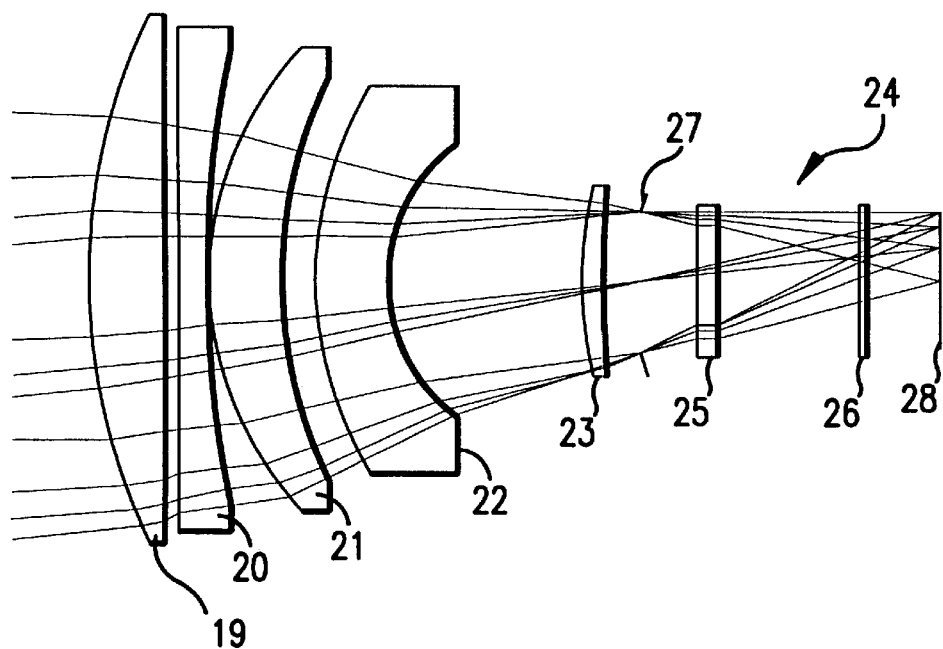
FIG. 5 is a five lens system according to still another embodiment of the invention.

In FIG. 5 a five lens system with a focal length of 90 mm and a relative aperture 2.0 will be seen. The lenses 19 through 23 are, in their order, selected from the materials 3, 1, 3, 2 and 3. In the case of the example the first lens 19 consists of ZnSe and not ZnS as in the examples 2 through 4. The second to fifth lenses 20 through 23 consist as in FIG. 3, in their order, of Si, ZnS, CaF$_2$ and ZnS. The system is connected with a dewar 24, which is merely indicated diagrammatically, with a termination disk 25, a filter 26, an external cold shield 27 and the detector 28.

Further modifications of the teaching in accordance with the invention may be elaborated with any difficulty. In this respect it is more particularly possible to derive the following developments, in which correction may be slightly impaired while still being adequate for different applications. Thus in all examples ZnS may be replaced by ZnSe and Si may be replaced by a chalcogenide glass or for example As$_2$S$_3$. In some cases ZnS or ZnSe may also be replaced by thallium bromide-iodide and CaF$_2$ may be replaced by MgO and BaF$_2$ and corresponding materials of the group 2.

Although the above account has been limited to a few preferred embodiments of the invention, this has not been with the intention of limiting the invention thereto. In fact a man in the art will have available a large number of possibilities in order to implement the common inventive principle and in order to adapt to particular circumstances of an individual case.

More particularly it is possible for an objective in accordance with the invention to be part of a complex dioptric or catadioptric IR optical system (for example of an afocal system or of an objective with a re-imager).

I claim:

1. A multi-lens infrared objective with wide band chromatic correction in a spectral range of 1.4 μm to 5 μm, whose lenses consist of different materials selected from three different material groups, the lenses of negative focal length being selected from two different material groups, of which the first group consists of materials whose short wave absorption bands are close to the shortest wavelength to be corrected and the second group consists of materials whose long wave absorption bands are closer to the spectral range to be corrected than the short wave ones, and at least one lens of positive focal length being selected from a material group consisting of materials whose absorption bands are between those of the first and second material groups.

2. The objective as defined in claim 1, wherein the first material group comprises the materials silicon, chalcogenide glasses, thallium bromide-iodide, the second material group comprises the materials $CaF_2$, MgO, $BaF_2$ and the third material group comprises the materials ZnS, ZnSe, NaCl and KRS5.

3. The objective as defined in claim 1, wherein as a combination Si—$CaF_2$ or Si—MgO is selected.

4. The objective as defined in claim 1 possessing a chromatic correction in the short wave range with a combination of a material selected from the group consisting of ZnS, ZnSe, and KRS5 and a material selected from the group consisting of Si, chalcogenide glass, and KRS5 and in the long wave range with a combination of a material selected from the group consisting of ZnS, ZnSe, and KRS5 and a material selected from the group consisting of $CaF_2$, MgO, and $BaF_2$.

5. The objective as defined in claim 1 in the form of a three-lens apochromat for the wavelength band 1.4 to 5 $\mu$m, first, second, and third lenses each consisting of a first material selected from the group consisting of Si and chalcogenide glass, a second material selected from the group consisting of ZnS and ZnSe, and a third material selected from the group consisting of MgO, $CaF_2$, and $BaF_2$.

6. The objective as defined in claim 1 in the form of a five lens system for the wavelength band 1.5 through 5 $\mu$m in which as seen in the direction of the incident light the first, third and fifth lenses each with a positive focal length consist of ZnS or ZnSe, the second lens with a negative focal length consists of $CaF_2$, MgO or $BaF_2$ and the fourth lens with a negative focal length consists of Si or a chalcogenide glass.

7. The objective as defined in claim 1 in the form of a five lens system for a wavelength band 1.4 through 5 $\mu$m, wherein the first, third and fifth lenses, each with a positive focal length, consist of ZnS or ZnSe, the second lens with a negative focal length consists of Si or a chalcogenide glass, and the fourth lens with a negative focal length consists of $CaF_2$, MgO or $BaF_2$.

8. The objective as defined in claim 1 in the form of a four lens system for a wavelength band 1.4 through 5 $\mu$m, wherein one of the two lenses with a positive focal length has an aspherical surface.

9. The objective as recited in claim 1 which is connected with a dewar.

10. The objective as defined in claim 1, wherein at least one of said lenses possesses at least one aspherical surface.

11. The provision of an objective as defined in claim 1 as part of a dioptric or catadioptric infrared optical system.

* * * * *